US012799387B2

(12) United States Patent
Imran et al.

(10) Patent No.: US 12,799,387 B2
(45) Date of Patent: Nov. 17, 2026

(54) PROCESS FOR THE SYNTHESIS OF OPTOELECTRONICALLY ACTIVE METAL HALIDE-BASED NANOPARTICLES AND NANOPARTICLES OBTAINED THEREBY

(71) Applicant: FONDAZIONE ISTITUTO ITALIANO DI TECNOLOGIA, Genoa (IT)

(72) Inventors: Muhammad Imran, Genoa (IT); Thanh Binh Mai, Genoa (IT); Francesco Di Stasio, Milan (IT); Teresa Pellegrino, Genoa (IT); Liberato Manna, Genoa (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 571 days.

(21) Appl. No.: 18/548,658

(22) PCT Filed: Mar. 3, 2022

(86) PCT No.: PCT/EP2022/055428
§ 371 (c)(1),
(2) Date: Sep. 1, 2023

(87) PCT Pub. No.: WO2022/184839
PCT Pub. Date: Sep. 9, 2022

(65) Prior Publication Data

US 2024/0166943 A1 May 23, 2024

(30) Foreign Application Priority Data

Mar. 5, 2021 (IT) ........................ 102021000005213

(51) Int. Cl.
*C09K 11/02* (2006.01)
*B82Y 20/00* (2011.01)
(Continued)

(52) U.S. Cl.
CPC ............ *C09K 11/025* (2013.01); *C09K 11/06* (2013.01); *C09K 11/665* (2013.01); *B82Y 20/00* (2013.01); *B82Y 40/00* (2013.01); *C09K 2211/10* (2013.01)

(58) Field of Classification Search
CPC ..... C09K 11/025; C09K 11/06; C09K 11/665; C09K 2211/10; B82Y 20/00; B82Y 40/00; Y02E 10/549
See application file for complete search history.

(56) References Cited

U.S. PATENT DOCUMENTS 10,889,756 B2 1/2021 Lüchinger et al.
2013/0030120 A1 1/2013 Lin et al.
(Continued)

FOREIGN PATENT DOCUMENTS

EP 3282000 A1 2/2018

OTHER PUBLICATIONS

Yijiang Liu et al., "Polar Organic Solvents-Tolerance Perovskite Nanocrystals Permanently Ligated with Polymer Hairs via Starlike Molecular Bottlebrush Trilobe Nanoreactors", NANO Letters, Nov. 2019 (29 pages).

(Continued)

*Primary Examiner* — Andrew J. Oyer
(74) *Attorney, Agent, or Firm* — Leason Ellis LLP

(57) ABSTRACT

It is described a process for the production of metal halide-based nanoparticles endowed with optoelectronic activity and characterized by an improved stability against polar solvents and laser irradiation compared to metal halide nanoparticles of the prior art.

14 Claims, 6 Drawing Sheets

(51) Int. Cl.

| | |
|---|---|
| ***B82Y 40/00*** | (2011.01) |
| ***C09K 11/06*** | (2006.01) |
| ***C09K 11/66*** | (2006.01) |

(56) References Cited

U.S. PATENT DOCUMENTS

| | | | | |
|---|---|---|---|---|
| 2018/0355244 | A1* | 12/2018 | Lüchinger .............. | C09K 11/02 |
| 2019/0008788 | A1 | 1/2019 | Prud'Homme et al. | |

OTHER PUBLICATIONS

International Search Report and Written Opinion for corresponding PCT Application No. PCT/EP2022/055428 dated Jun. 27, 2022 (12 pages).

* cited by examiner

PROCESS FOR THE SYNTHESIS OF OPTOELECTRONICALLY ACTIVE METAL HALIDE-BASED NANOPARTICLES AND NANOPARTICLES OBTAINED THEREBY

CROSS-REFERENCE TO RELATED APPLICATIONS

This application is a U.S. National Stage Application under 35 U.S.C. § 371 of International Patent Application No. PCT/EP2022/055428, filed Mar. 3, 2022, which claims priority to Italian Patent Application No. 102021000005213 filed Mar. 5, 2021, the contents of which are each hereby incorporated by reference in their respective entireties.

FIELD OF THE INVENTION

The present invention refers to a process for the synthesis of metal halide-based nanoparticles endowed with optoelectronic activity and to the nanoparticles obtained through the process.

STATE OF THE ART

Metal halide perovskite nanocrystals have emerged as promising materials for optoelectronic applications including, to name just some, solar cells, light emission technologies, photodetectors and lasers. Nanocrystals are usually referred to in the field with the abbreviation NCs, that will be used in the rest of the description.

Metal halide perovskite NCs have general formula $AMX_3$, where A is a monovalent cation selected between $Rb^+$, $Cs^+$, $CH_3NH_3^+$, $CH_2(NH_2)_2^+$, M is a divalent cation, usually selected among $Pb^{2+}$ and $Sn^{2+}$, and X is selected among $F^-$, $CF^-$, $Br^-$ and $I^-$. The properties of light emission or absorption of these materials can be modulated by varying the specific composition. For instance, a desired emission wavelength (from 400 nm to 700 nm or even beyond, in the near infrared region) can be achieved by adjusting the halide composition, either directly during their synthesis, or through a post-synthesis partial/complete halide exchange reaction, or even through the addition of dopants, during or post-synthesis. The interest in this field, and the related technological applications, have extended beyond the $AMX_3$ composition and the perovskite crystal structure, to encompass metal halide NCs of other compositions and crystal structures as well. This broader class of materials is referred to in the description that follows as "optoelectronic metal halide NCs", or with the abbreviation OMR NCs.

These materials can be conveniently prepared by known chemical synthesis approaches; the control of crystal growth and the obtainment of nanosized materials is achieved during the synthesis by the ratio between non-linear block copolymers, acting as templates for NCs growth, and the precursors of the NCs. Polymeric micelles have also been used in the past decades as templates to synthesize various types of inorganic NCs. This approach is highly desirable as it enables the synthesis of NCs with low polydispersity. The NCs, as delivered from the synthesis, are coated with a layer made of organic molecules. These molecules have a functional head group, by which they are anchored to the surface of the NCs, and one or more aliphatic chains (usually 6-18 nm long) which help to stabilize the NCs in non-polar or moderately polar organic solvents.

One problem encountered with these materials is that when OMH NCs of different compositions are deposited together in solid films or mixed together in a colloidal suspension, for example with the scope of combining together different emission colors and obtain white emission, the NCs undergo rapid halide ion exchange, such that at steady state each individual NC in the sample reaches the same average halide composition; this in turn leads to a film (or a colloidal suspension) emitting in a single color, dictated by the relative abundance of the various halide ions present in the sample. Such color instability limits the use of OMH NCs as multicolor emitters in displays. In addition to the color instability, OMH NCs have poor stability against moisture, polar solvents, and long-time exposure to high flux irradiation. All these agents cause a quick degradation of the optoelectronic properties of the NCs.

Various strategies have been designed to stabilize OMH NCs against these agents and preserve color stability. Such strategies include the encapsulation of NCs in matrixes made of metal oxides (e.g. $SiO_2$, $TiO_2$, $Al_2O_3$), inorganic salts ($SrBr_2$), metal organic hybrids (e.g. metal organic frameworks) and polymers or polymeric micelles; polymers and polymeric micelles allow obtaining a stable surface coating of NCs. NCs coated with organic molecules and/or polymers will be referred to in the rest of the description as nanoparticles, or with the abbreviation NPs; similarly, the term "optoelectronic metal halide NPs" and the abbreviation OMH NPs will be used.

The coating of NCs with polymers has been described for instance in patent application US 2013/0030120 A1, which discloses a star-like polymeric unit produced derivatizing a β-cyclodextrin with several polymeric branches and the functionalizing of the branches with groups capable of binding on the NCs surface. This document describes numerous compositions and structures of polymers for NCs encapsulation, as well as numerous kinds of NPs with different compositions and uses, not limited to optoelectronic functionalities, and does not report any data allowing assessing a degree of stabilization achieved with the disclosed polymeric compounds.

Further studies have shown that polymers with hydrophobic characteristics, such as poly (methyl methacrylate), polyimide, poly (lauryl methacrylate), polystyrene (PS) and their derivatives are suitable choices to protect OMH NCs from polar solvents and they have been widely tested in this regard.

Similarly, various types of polymeric micelles (e.g. poly (styrene-block-4-vinyl pyridine) have been used as a template to encapsulate in situ individual OMH NCs. The resulting encapsulated NCs exhibited increased stability against polar solvents and photo-irradiation. The paper "Polar organic solvent-tolerant perovskite nanocrystals permanently ligated with polymer hairs via star-like molecular bottlebrush trilobe nanoreactors", Y. Liu et al., Nano Lett. 2019, 19, pages 9019-9028, describes the capping of NCs with a "trilobe" (i.e., three-branched) polymer comprising a poly(2-hydroxyethyl methacrylate) (PHEMA) backbone onto which are grafted units of a block copolymer of poly(acrylic acid) and partially cross-linked polystyrene. This paper reports stability test of polymer coated $CsPbBr^3$ NPs against polar solvents and shows that the NPs could withstand up to 20% volume of methanol. Furthermore, a photostability test under mild irradiation conditions (365 nm, 400 μW/$cm^2$) shows that the polymer coated $CsPbBr_3$ NPs nearly retain their PL after 35 h of exposure to the UV light. While these results represent an improvement over previously known systems, the synthesis of the trilobe copolymers described in this document requires many consecutive polymerizations along with multiple post-polymerization modification steps and is not suitable for an industrial scale production. Moreover, and most importantly, the assembly of trilobe polymer might not result in symmetric and well-shielded micelles; this, in turn, may create less shielded regions on the surface of the NCs that might enable contact between the solvent molecules and the NCs. The stability of the NCs of this paper against concentrations of polar solvents (e.g. methanol, ethanol, water) higher than 20% and against high flux irradiation is still poor.

Overall, the stability of the OMH NPs available to date under operating conditions that are typical of various fields of applications (high humidity, polar solvents, high flux irradiation, high temperature, etc.) are not yet satisfactory.

It is an object of the present invention to provide a process for the production of OMH NPs of enhanced resistance against moisture, polar solvents and long-time exposure to high flux irradiation, required for the widespread industrial application of these materials.

SUMMARY OF THE INVENTION

This object is obtained in the present invention that, in a first aspect thereof refers to a process for the production of optoelectronic metal halide nanoparticles, formed by polymer-coated metal halide nanocrystals, comprising the following steps:

- a) preparing a precursor solution comprising:
  - a solvent selected among dimethyl sulfoxide, N,N-dimethyl acetamide, dimethyl formamide, N-methyl formamide and mixtures thereof;
  - halide salts of one or more cations intended for forming the nanocrystals, wherein the halide anion is one or more selected among F, CF, Br and F;
  - a block copolymer containing one or more polar blocks and one or more non-polar or moderately polar blocks;
- b) adding the precursor solution dropwise to a solvent which is selective for the non-polar or moderately polar blocks of the block copolymer, selected among toluene, xylene, mesitylene, ethyl acetate, anisole and mixtures thereof forming a suspension, and allowing the system to react forming optoelectronic metal halide nanoparticles, until the obtained suspension changes color;
- c) quenching the reaction of step b) by addition of a solvent selected among pentane, hexane, heptane, diethyl ether and mixtures thereof;
- d) collecting the optoelectronic metal halide nanoparticles;

characterized in that the precursor solution of step a) further comprises one or more additive molecules, characterized by containing two or more functional groups and one or more aliphatic, cycloaliphatic or aromatic chains, preferably with a chain length comprised between 4 and 12 carbon atoms.

In its second aspect, the invention refers to the stable optoelectronic metal halide nanoparticles obtained according to the process described above.

DETAILED DESCRIPTION OF THE INVENTION

Figure 1:
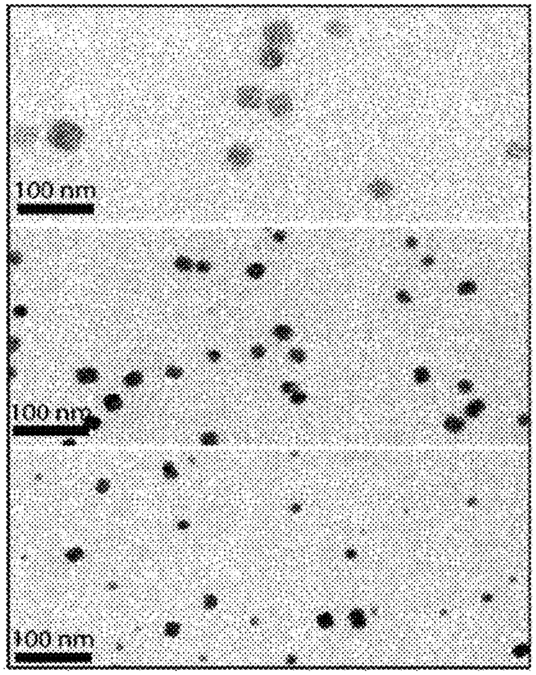
FIG. 1 shows transmission electron microscope (TEM) micrographs of samples of OMH NPs prepared according to the process of the invention.

The present invention is characterized, and distinguished from the known OMH NPs synthesis methods, for the presence of the additive molecules described above during the synthesis of the NPs. The inventors have observed that the modification of the standard encapsulation methods with the addition of these additive molecules leads to a significant increase of stability of the resulting OMH NPs, even with the use of protective block copolymers of relatively simple structure.

The OMH NPs of the invention are composed of a core made of the metallic halide, that is, the NC, the surface of which is covered with an organic coating formed by the additive molecule(s) and the block copolymers.

The OMH NCs of the invention may have a wide variability of composition, comprising the standard composition $AMX_3$, and compositions and structures derived therefrom. In the description that follows, $MA^+$ stands for methylammonium, $CH_3NH_3^+$, and $FA^+$ stands for formamidinium, $CH(NH_2)_2^+$.

The simplest composition of OMH NCs according to the invention is the classical perovskite composition $AMX_3$, where A is a monovalent cation selected among $Cs^+$, $MA^+$, $FA^+$, with possible dopants selected among monovalent cations such as $K^+$ and $Rb^+$ and divalent cations such as $Mn^{2+}$, $Cd^{2+}$, $Zn^{2+}$, $Sn^{2+}$, $Ge^{2+}$; M is a divalent cation selected among $Pb^{2+}$ and $Sn^{2+}$; X is selected among $F^-$, $Cr^-$, $Br^-$ and $I^-$ or mixtures thereof, so that mixed halide compositions are possible, such as $AM(Cl,Br)_3$ or $AM(Br,I)_3$; the preferred halide ions for the objects of the present invention are $Cl^-$, $Br^-$ and $I^-$.

Other possible NCs compositions are:

- $A_2M'X_6$, wherein A is a monovalent cation as indicated above (including the dopant ions), and M' is a tetravalent cation, for instance $Sn^{4+}$ or $Ti^{4+}$;

$A_2M'M''X_6$, wherein A and M' are monovalent cations as indicated above (including the dopant ions) and M" is a trivalent cation, such as $Al^{3+}$, $Bi^{3+}$, $Sb^{3+}$, $Yb^{3+}$, $Eu^{3+}$, $Er^{3+}$, $Ho^{3+}$, $Nd^{3+}$.

$A_3M''_2X_9$, wherein A is a monovalent cation as indicated above (including the dopant ions) and M" is a trivalent cation as indicated above.

The process of the invention includes as the first step, a), the preparation of a precursor solution containing the desired halide ion(s) and cation(s), a block copolymer containing one or more polar blocks and one or more non-polar or moderately polar blocks, and one or more additive molecules bearing two or more functional groups, in a solvent selected among dimethyl sulfoxide, N,N-dimethyl acetamide, dimethyl formamide, N-methyl formamide and mixtures of these solvents.

As said above, the OMR NPs may include more than one halogen atom; the salts of the different cations used for a synthesis need not thus to include the same halogen and, just to make an example, the process of the invention could begin with the preparation of a solution containing CsCl and $PbBr_2$ as the halide salts.

The block copolymer has amphiphilic properties, due to the presence in the polymer chain of hydrophilic and hydrophobic moieties. The hydrophilic moieties of the block copolymer are preferably selected between poly acrylic acid (PAA) and poly methacrylic acid (PMA); the hydrophobic moieties are preferably selected among poly(alkyl methacrylate)s with length of the alkyl chain(s) ranging from 1 to 12 carbon atoms, polyesters (particularly polylactide, polyglycolide and polycaprolactone) and, more preferably, polystyrene (PS). A typical block copolymer suitable for the objects of the invention has the general formula shown below:

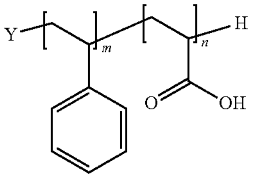

wherein m can range between 14 and 14000 and n can range between 10 and 5200, and Y typically is a nitrile functional group, or a radical bearing a nitrile functional group.

The synthesis of these block copolymers is well known to those skilled in the art. These copolymers are also commercially available.

The use of an additive molecule in the synthesis of the OMH NCs is the key feature of the present invention; these additive molecules likely act improving the compatibility between the surface of the NCs and the block copolymer. Said additive molecules are characterized by containing two or more functional groups, in particular carboxylic, phosphonic, amino and combinations of these, and one or more aliphatic, cycloaliphatic or aromatic chains, preferably with a chain length comprised between 4 and 12 carbon atoms. Examples of additive molecules that have proven suitable for the aims of the invention are succinic acid (two carboxylic groups, $C_4$ aliphatic chain), γ-aminobutyric acid (one carboxylic group and one primary amino group, $C_4$ aliphatic chain), 5-aminovaleric acid (one carboxylic group and one primary amino group, $C_5$ aliphatic chain), 3-aminopropylphosphonic acid (one phosphonic group and one primary amino group, $C_3$ aliphatic chain), L-valine (one carboxylic group and one primary amino group, branched-05 aliphatic chain), L-proline (one secondary amino group in a 5-membered ring and one carboxylic group, $C_5$ aliphatic chain), L-glutamic acid (one amino group and two carboxylic groups, CS aliphatic chain) and 2-aminoterephthalic acid (one amino group and two carboxylic groups, aromatic chain).

The amounts of the various components added in the precursor solution are calculated based on the amount of M, M' or M" cation, or on the sum of M' and M" cations when the desired NC composition is of the kind $A_2M'M''X_6$.

Known the amount of cations M, M' and M" in the precursor solution, the required amount of A cation(s) is easily calculated from the stoichiometry of the specific NC to be produced. The amount of block copolymer is such that the molar ratio between the monomers of the polar blocks and the M, M' or M" cation(s) is between 10 and 20. Finally, the amount of additive molecules is such that the molar ratio M, M' or M" cation(s) to said additive molecules is between 20 and 30.

The concentration of the M, M' or M" cation(s) in the precursor solution is conveniently chosen in the range from 10 to 100 mM/l (millimolar); the concentrations of the other components of the precursor solution are calculated as a consequence from the ratios to M, M' or M" cation(s) defined above.

The precursor solution can be prepared in various ways. It is possible to prepare separate stock solutions of the various components (halide salts of the useful cations, block copolymers, additive molecules) and then mixing them in suitable ratios to obtain the desired overall composition. Alternatively, it is possible to prepare the precursor solution adding all the components in the correct amounts to one of the solvents indicated above. Intermediate methods are also possible: for instance, it could be possible to prepare a solution containing the block copolymer and the additive molecules in the correct ratio as a stock solution, and to add the halide salts to this intermediate solution. Any other order of addition of components can be followed, as will be evident to the skilled person.

The preparation of the precursor solution, or of the intermediate stock solutions, takes place under agitation or stirring, to obtain a uniform composition of the same. Once prepared, this precursor solution is stable indefinitely; if it has been prepared long before its use, it is better re-agitated prior to its use in step b), to re-homogenize its components.

In step b) of the process of the invention, the precursor solution prepared in step a) is added dropwise to a solvent which is selective for the non-polar or moderately polar blocks of the block copolymer, selected among toluene, xylene, mesitylene, ethyl acetate, anisole and mixtures thereof. The addition of the precursor solution to said solvent takes place under ambient conditions (typically, a temperature between 20 and 25° C. and a pressure between $9.8 \cdot 10^4$ and $1.04 \cdot 10^5$ Pa) and under agitation. The reaction of formation of OMH NPs takes place nearly immediately and is indicated by the change of color of the formed suspension.

When the addition of the precursor solution to the solvent is concluded, the reaction is quenched in step c) by addition of an excess of a solvent selected among pentane, hexane, heptane, diethyl ether and their mixtures. By "an excess" it is meant a volume of quenching solvent of at least 1.5 times the volume of suspension prepared in step b).

Finally, in the last step of the process of the invention, d), the OMH NPs are recovered from the suspension. The preferred method is by centrifugation, but also alternative methods could be used, for instance it is possible to use in step c) a great excess of quenching solvent, causing an immediate precipitation of the OMH NPs, which thereafter can be collected by simply decanting the solvents. In case of centrifugation, after discarding the supernatant the precipitate is preferably redispersed in the solvent of step b) followed by another round of centrifugation and redispersion.

The OMH NPs suspension thus obtained can be used as such for characterization or for their intended uses. Additionally, the emission color of the NCs can be tuned towards red or blue by introducing appropriate halide precursors (CF, BC and ions) in such suspension (as explained in detail below).

In its second aspect, the invention refers to the OMH NPs obtained according to the process described above. Although difficult to observe directly, the inventors believe that these NPs comprise a layer of additive molecules in direct contact with the surface of the OMH NC, forming an intermediate layer between the core and the outer shell made of the block copolymer. An indirect evidence of the presence of the additive molecule(s) in the final product is provided by the enhanced stability of the OMH NPs of the invention compared to similar NPs of the prior art. In fact, the inventors have observed that mixing together dry powders or colloidal suspensions (in polar solvents), or yet preparing films of multiple samples of OMH NPs emitting at different wavelengths, results in a final emission spectrum that is the weighted sum of the emission spectra of the individual NC components, and importantly, the emission intensity remains stable for months of storage under air. This unique feature enables the preparation of multicolor emissive samples that retain their spectral features.

Another unique feature of the OMH NPs of the invention is the possibility to reversibly turn on/off the anion exchange reaction. When the OMH NCs are dispersed in a polar solvent, in which the hydrophobic component of the block copolymer is not soluble, the polymer shell is closed ("globule state"), anion exchange reactions are prevented, and the pristine emission color of the NCs is preserved. The opposite is observed in solvents or mixtures of solvents (toluene or toluene plus methanol) in which the hydrophobic component of the block copolymer is soluble: in these conditions, the copolymer shell is partially or completely open ("coil state"), anion exchange is allowed and the emission color of the NCs can be tuned across the entire visible spectrum by dosing the appropriate amount of halide precursors.

This is indeed confirmed by the excellent stability of the NCs against polar solvents (such as methanol, ethanol and water) and by the inhibition of anion exchange reactions, even at high temperatures (70° C.) in these solvents. In comparison, the polymer encapsulated perovskite NCs described in the paper of Liu et al. discussed above could not withstand more than 20% volume of the same polar solvents.

The invention will be further illustrated by the examples that follow.

Instruments and Methods

Structural characterization: Structural analysis was performed on a PANanalytical Empyrean X-ray diffractometer, equipped with a 1.8 kW CuK$\alpha$ ceramic X-ray tube, operating at 45 kV and 40 mA, and a PIXcel$^{3D}$2×2 area detector. Colloidal dispersion of corresponding NCs was drop-cast on zero-diffraction silicon substrate. All the diffraction patterns reported in this work were collected at room temperature under ambient conditions using parallel beam geometry and symmetric reflection mode. Post-acquisition XR data analysis was carried out using the HighScore 4.1 software from PANalytical.

Morphological characterization: TEM images of the NC samples were acquired with a JEOL-1100 transmission electron microscope operating at an acceleration voltage of 100 kV. Samples were prepared by drop casting diluted solutions of NCs onto carbon film-coated 200 mesh copper grids.

Spectroscopic measurements. Optical absorption spectra were recorded using a Varian Cary 300 UV-VIS absorption spectrophotometer. The PL spectra were measured on a Varian Cary Eclipse spectrophotometer using an excitation wavelength ($\lambda_{ex}$) of 350 nm for all the samples. Samples were prepared by diluting NC solutions in toluene, in quartz cuvettes with a path length of 1 cm. Absolute Photoluminescence quantum yields of NC samples were measured using an Edinburgh FLS900 fluorescence spectrometer equipped with a Xenon lamp, a monochromator for steady-state PL excitation, and a time-correlated single photon counting unit coupled with a pulsed laser diode ($\lambda_{ex}$=405 nm, pulse width=50 ps) for time-resolved PL. The PLQY was measured using a calibrated integrating sphere ($\lambda_{ex}$=350 nm for all samples). For the PLQY measurements, all the NC dispersions were diluted to an optical density of 0.1±0.02 at the corresponding excitation wavelength in order to minimize the amount of fluorophore being reabsorbed.

Laser Irradiation Stability Test:

Stability tests were carried out using a continuous wave laser diode for excitation ($\lambda_{ex}$=445 nm, Oxxius LBX-445-650-HPE-PP, max power 715 mW) coupled with an iris to reduce the circular excitation spot to a diameter of 1 mm (spot size was determined with Thorlabs BP209-VIS/M beam profiler). The excitation power was measured after the iris using a Thorlabs PM100D Digital Optical Power meter interfaced with a Thorlabs S121C photodiode. Samples for the stability test were prepared by blending the NCs dispersion with polystyrene (20-30 mg/mL) in toluene. Thereafter, the solution was precipitated by adding 12 mL of hexane followed by overnight drying in vacuum oven at 40° C. Then, the powder was grounded by using mortar pestle and placed inside a glass cell. The emission was monitored via a collimator/optical fiber/filter holder/optical fiber assembly coupled with an Ocean Optics HR4000 spectrometer. The collection optics was placed at 45° with the respect to the excitation beam and a long pass filter ($\lambda_{cut\text{-}off}$=450 nm, Thorlabs FEL0450) was placed in the fiber coupled filter holder. The emission was collected every 60 seconds using the Ocean View software.

Example 1

This example refers to the synthesis of copolymer encapsulated $APbBr_3$ NCs, where A may be $Cs^+$, the monovalent formamidine ion ($FA^+$), or a mixture of the two.

As the block copolymer, a polystyrene-block-poly(acrylic acid) copolymer sold by Sigma-Aldrich with catalog number 746991, referred to in the following as PAA-b-PS, has been used; in this product, the PAA blocks have average molar mass of 5000 g/mol and the PS blocks have average molar mass of 28000 g/mol.

Solutions of metal bromide salts (CsBr, FABr and $PbBr_2$), of 5-aminovaleric acid (AVAc) as an additive molecule and of PAA-b-PS block copolymer were prepared separately by dissolving the compounds in DMF; the solutions had concentration 10 mM each in case of the halide salts, 17 mM in case of AVAc and 110 mg/mL in case of PAA-b-PS.

Then, a precursor solution obtained by mixing 100 μL of the ABr solutions, 100 μL of the $PbBr_2$ solution, 4 μL of the AVAc solution and 75 μL of the PAA-b-PS solution was injected dropwise into a 20 mL vial containing toluene (8 mL) under vigorous stirring at room temperature in air. The preparation was carried out three times, the first time with CsBr only obtaining $CsPbBr_3$ NPs, the second time with FABr only obtaining $FAPbBr_3$ NPs and the third time with a ABr solution comprising CsBr and FABr in a 1:1 molar ratio obtaining $Cs_{0.5}FA_{0.5}PbBr_3$ NPs. In all cases the color of the solution immediately turned green indicating the formation of perovskite NPs.

After about 20 seconds, the reaction was quenched by adding 12 ml of hexane and the NPs were collected by centrifugation. The supernatant was discarded, and the precipitate was re-dispersed in toluene, the system was centrifuged again, the supernatant eliminated, and the collected NPs redispersed in toluene.

The suspensions thus obtained are Sample 1 ($CsPbBr_3$ NPs), Sample 2 ($FAPbBr_3$ NPs) and Sample 3 ($Cs_{0.5}FA_{0.5}PbBr_3$ NPs).

Example 2

This example refers to morphological, structural and optical characterizations of Samples 1-3 obtained in Example 1.

Specimens of the three samples were drop-cast on carbon coated copper grids and zero diffraction silicon wafer for morphological and structural characterization, respectively.

Morphological characterization of the dried samples by using transmission electron microscopy (TEM) has revealed the presence of nearly cubic shaped NCs in all three samples. The obtained micrographs are reproduced in FIG. 1: respectively, the micrograph in the upper part of the figure refers to Sample 2, the micrograph in the central part of the figure refers to Sample 3, and the micrograph in the lower part of the figure refers to Sample 1.

Figure 2:
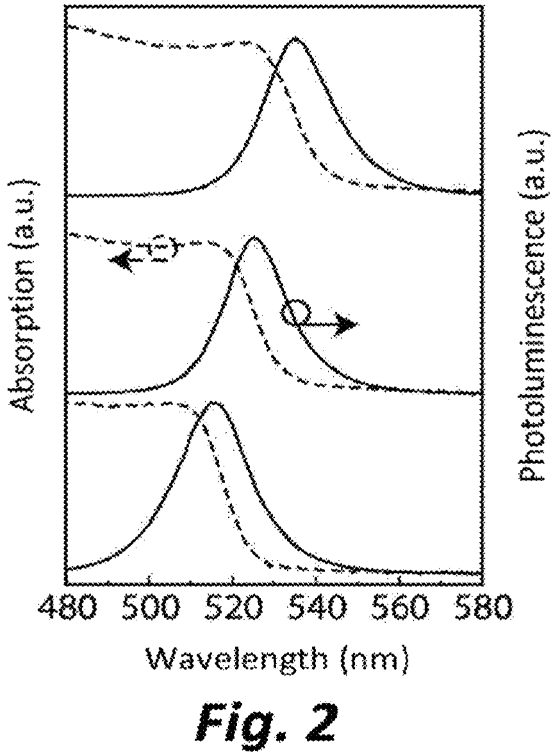
FIG. 2 shows optical absorption and photoluminescence spectra of the three samples of FIG. 1.

UV-Vis optical absorption and photoluminescence (PL) spectra recorded in toluene dispersions are reported in FIG. 2, in which again the two graphs in the upper part of the figure refer to Sample 2, the two graphs in the central part of the figure refer to Sample 3, and the two graphs in the lower part of the figure refer to Sample 1. The NPs have a narrow emission centered at 517 nm for $CsPbBr_3$, 527 nm for $Cs_{0.5}FA_{0.5}PbBr_3$ and 535 nm for $FAPbBr_3$ with emission line width in the range of 18-22 nm.

Figure 3A:
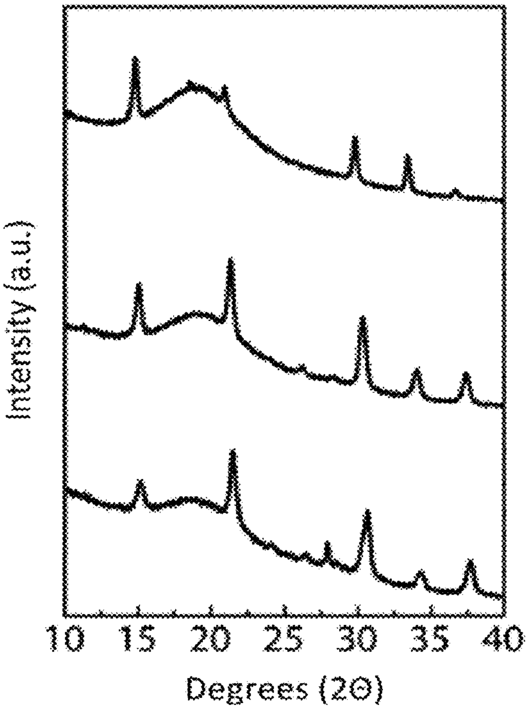
FIGS. 3*a* and 3*b* show, respectively, X-Ray diffraction spectra of the three samples shown in FIG. 1 and an enlargement of relevant portions of the same spectra.
Figure 3B:
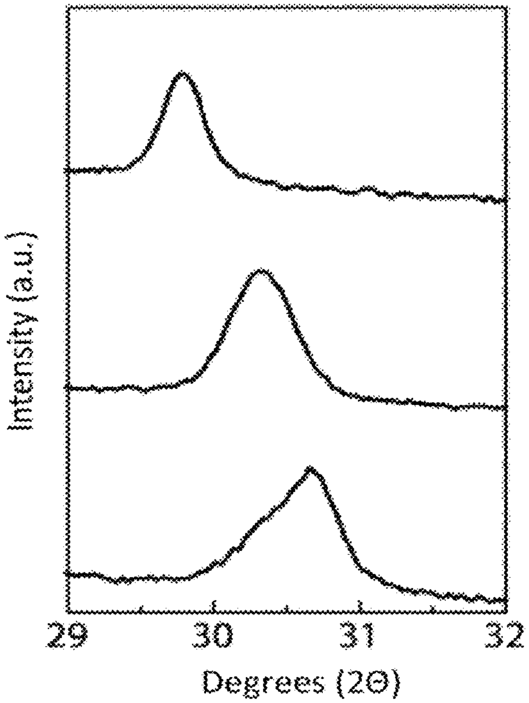

The structural characterization by X-ray diffraction (XRD) reported in FIG. 3*a* shows the crystalline nature of the corresponding samples, with perovskite as the only detectable phase. In this case too, the graph in the upper part of the figure refers to Sample 2, the graph in the central part of the figure refers to Sample 3, and the graph in the lower part of the figure refers to Sample 1. The small hump around 18° (2θ) in all diffractograms can be ascribed to the polymer shell. Furthermore, partial or complete substitution of A-site cation Cs with FA is attested by the shift of the XRD peaks toward lower angles for the series $CsPbBr_3 \rightarrow Cs_{0.5}FA_{0.5}PbBr_3 \rightarrow FAPbBr_3$ (see FIG. 3*b*, showing the shift of a characteristic peak around 30° 2θ). This confirms the expansion in the unit cell volume due to substitution of smaller ionic radii cations (in this case, Cs) with larger ones (FA).

Example 3

This example refers to test to assess the stability of the OMH NPs of the invention against polar solvents.

Figure 4A:
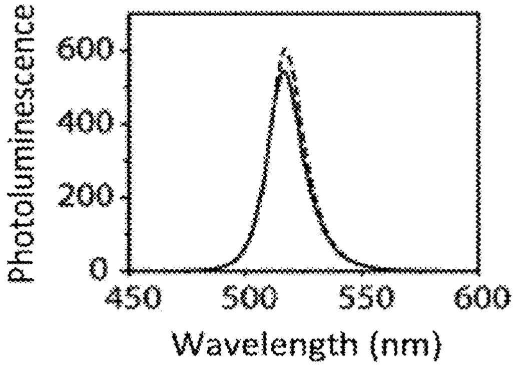
FIGS. 4*a* to 4*d* report graphs showing the retention of PL properties of NPs of the invention exposed to different solvents.
Figure 4B:
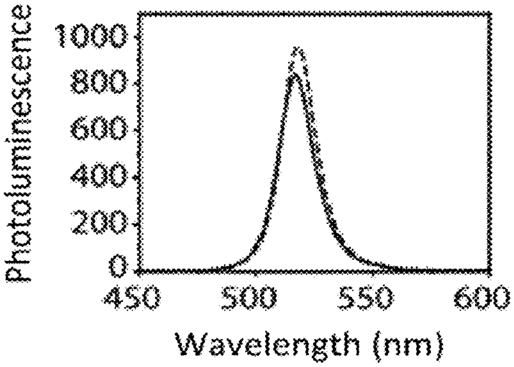
Figure 4C:
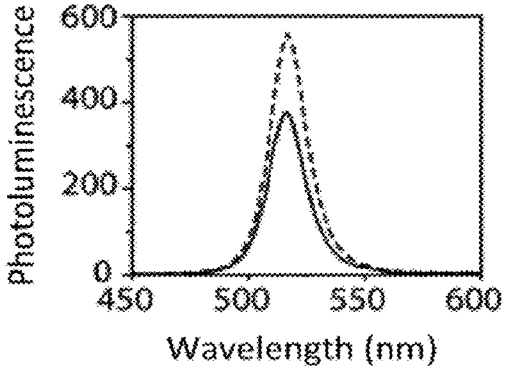
Figure 4D:
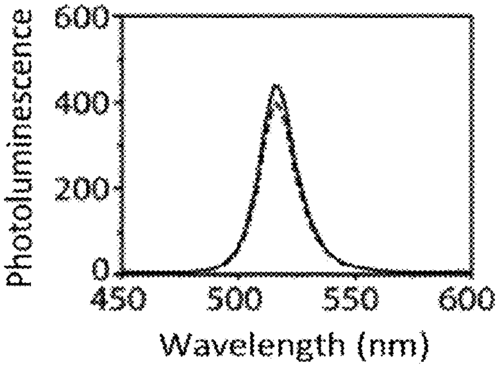
Figure 5:
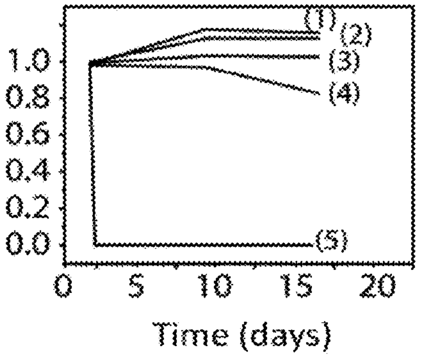
FIG. 5 shows the trend of PL over time derived from the graphs of FIGS. 4*a* to 4*d*, and for comparison the trend over time for a prior art sample exposed to methanol.

Specimens of Sample 1 were added dropwise to methanol at the volume ratio of 1 to 10 (toluene to methanol) at 25° C. in air. After about 30 s, 12 ml hexane was added and the NPs suspension was centrifuged. The supernatant was discarded, and the precipitate was re-dispersed in the selected test polar solvent (methanol, ethanol or water). Finally, the NPs suspensions in polar solvents were store at 25° C. in air to examine the PL stability over ageing. The PL spectra recorded over time for the NPs of Sample 1 dispersed in various solvents are reported in FIGS. 4*a* to 4*d*; specifically, the spectra in FIG. 4*a* have been obtained in toluene, the spectra in FIG. 4*b* in water, the spectra in FIG. 4*c* in ethanol and those in FIG. 4*d* in methanol. Quantitative data showing the drop of PL intensity of the corresponding polymer coated samples versus bare reference $CsPbBr_3$ NPs are reported in FIG. 5, in which curve 1 relates to the trend of the PL of the sample of the invention in ethanol, curve 2 the trend of the sample of the invention in water, curve 3 the trend of the sample of the invention in toluene, curve 4 the trend of the sample of the invention in methanol, and curve 5 the trend of the reference sample (bare $CsPbBr_3$ NPs). From inspection of FIGS. 4*a*-4*d* and 5, it can be observed that the NPs dispersed in toluene, ethanol and water nearly retained their PL intensity and PL spectral position. In methanol dispersion, a 18% drop in PL intensity was observed after 14 days of ageing, and the PL spectral position remained nearly unchanged. To the contrary, when dispersed in methanol, the reference bare sample immediately lost its PL.

Example 4

This example demonstrates the possibility of controlling the composition, and as a consequence the optoelectronic properties, of the OMR NPs of the invention.

Figure 6:
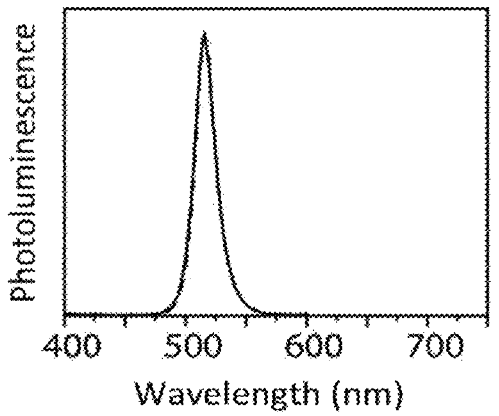
FIG. 6 reproduces graphs showing the stability over time of PL features of a sample of NPs of the invention.

A specimen of Sample 1, emitting in the green range (515-525 nm), was treated with different halide compounds in different solvents. In detail, two separate suspensions, containing Sample 1, of equal volumes and concentrations, were prepared by dispersing the NPs in methanol. Precursor solutions of halide ions ($Cl^-$ and $I^-$) were also prepared. The solution of CF ions was then added to one sample suspension and the solution of $I^-$ ions was added to the other sample suspension, in both cases in a large excess, in an attempt to promote anion exchange. In both cases, however, even after several days the PL spectral position and the PL linewidth of the starting bromine-based NPs were retained as shown in FIG. 6, in which the three PL spectra are completely superimposed (appearing as a single curve), thus confirming the complete inhibition of the anion exchange reaction.

Figure 7:
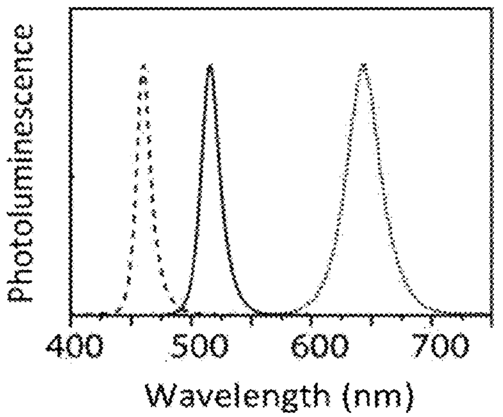
FIG. 7 illustrates the tunability of PL emission color of a sample of NPs of the invention.

The test was repeated, this time however adding $Cl^-$ and $I^-$ to specimens of Sample 1 in toluene; in this solvent, the polymeric shell surrounding the NPs core is in the coil state, which allows anion exchange. For tuning the emission color from green to blue, a specimen of Sample 1 in toluene was mixed with a didecyldimethylammonium chloride solution (pre-dissolved in toluene, 25 mM) under continuous stirring. For obtaining red emitting NPs, oleylammonium iodide (prepared separately by reacting molecular iodine with oleylamine; $I^-$ concentration 0.4 M) was added to a specimen of Sample 1. Once the desired emission color was obtained, the polymer shell was closed (globule state) by exposing the NPs suspensions to polar solvents, the NPs were precipitated by centrifugation and the resulting precipitates were dried in a vacuum oven at 40° C., yielding a dry powder. The powders were finally grounded in a ceramic crucible. The PL spectra of the NPs obtained are reported in FIG. 7, in which the central peak is relative to the PL emission of the starting material (Sample 1), the peak with emission between about 430 and 500 nm is relative to the sample obtained by equilibration with chloride, and the peak with emission between about 600 and 700 nm is relative to the sample obtained by equilibration with iodide. The spectral features of the multicolor powders remain unchanged over months of storage under ambient conditions.

Example 5

This example demonstrates the stability of multicolor powders of the invention.

Figure 8:
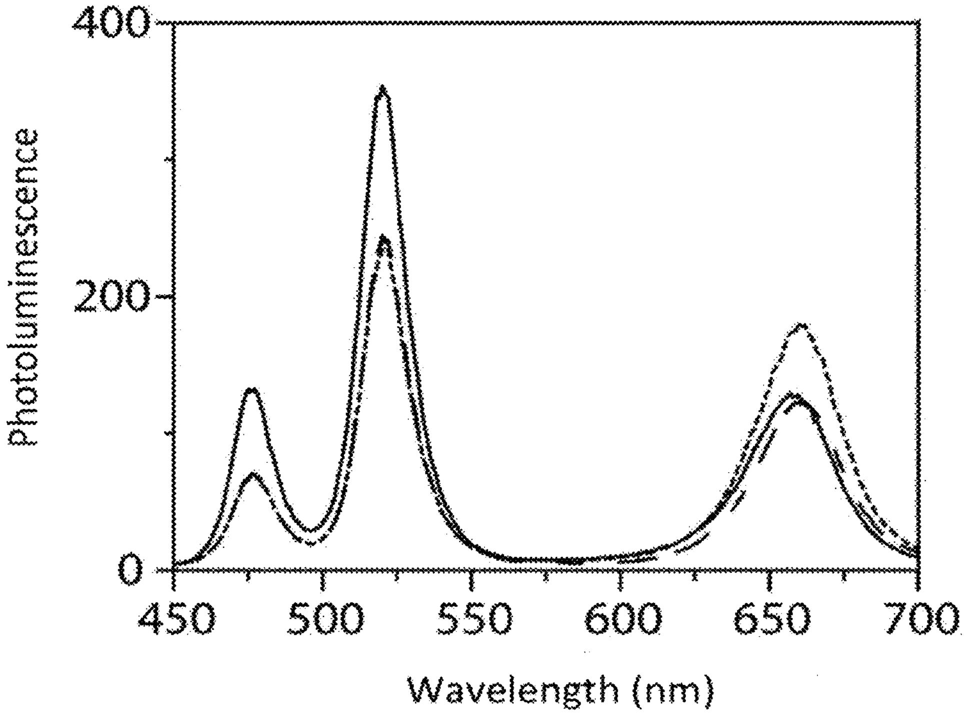
FIG. 8 shows graphs that demonstrate the stability over time of PL features of a sample obtained mixing NPs of the invention with different halide compositions.

Red and blue emitting specimens were prepared by performing anion exchange reaction on a specimen of Sample 1. Then, the polymer shell for all three materials was closed by adding a mixture of methanol and hexane in 1:3 volume ratio. The resulting mixtures were centrifuged at 6000 rpm for 5 minutes. The supernatant of each suspension was discarded, and the precipitate was dried in vacuum oven at 40° C. The obtained powders were individually ground with a mortar and pestle in a ceramic crucible and then mixed in an appropriate ratio to get a multicolor emitting product. Remarkably, the spectral features of the multicolor powder remained unchanged over months of storage under ambient conditions, as demonstrated by the stable positions of peaks in PL spectra reproduced in FIG. 8, which were recorded on the freshly prepared sample, after two weeks and after two months ageing.

Example 6

This example is directed to demonstrating the fluorescence stability of OMR NPs of the invention against laser irradiation.

Specimens of Samples 1 to 3 were dried and subjected to a high flux photon irradiation test; the powders were placed between two glass slides and irradiated continuously under a flux of 3.2 $W/cm^2$ for 60 minutes at 445 nm. Notably, these high flux irradiation conditions are nearly ten times harsher than the required industrial standards for the displays (100-400 $mW/cm^2$). For comparison, a $CsPbBr_3$ NPs sample prepared via a standard colloidal approach (reference) was blended with polystyrene and tested in parallel under identical conditions.

Figure 9A:
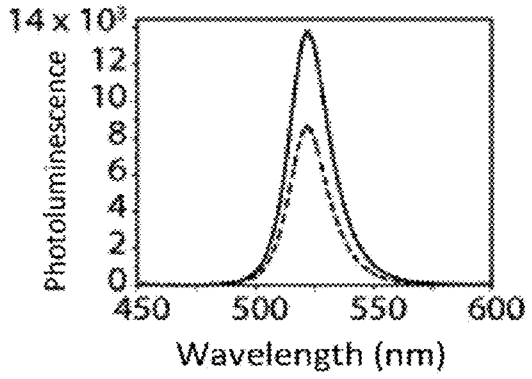
FIG. 9 illustrates the stability of PL emission of samples of NPs of the invention towards high flux (laser) irradiation.
Figure 9B:
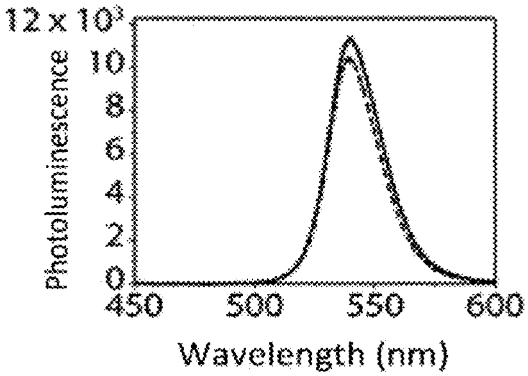
Figure 9C:
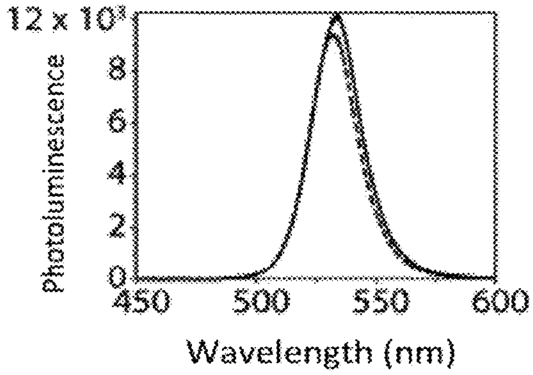
Figure 9D:
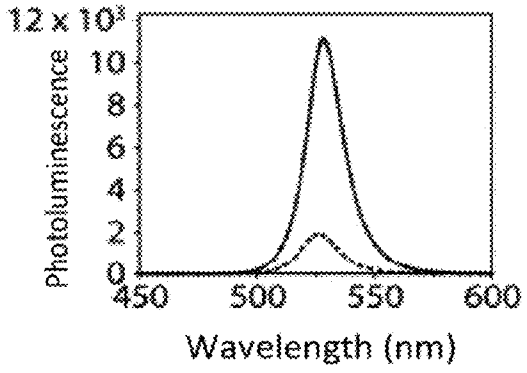
Figure 10:
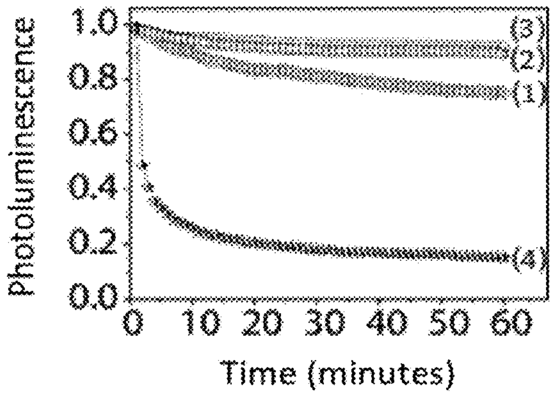
FIG. 10 shows the trend of PL over time for samples of the invention and a sample of the prior art derived from the graphs of FIGS. 9*a* to 9*d;*

The decrease of photoluminescence (PL) spectra for the materials of the invention is shown in FIGS. 9*a* to 9*c* respectively for Samples 1 to 3 of the invention, while the two spectra in FIG. 9*d* show the decrease of PL for the comparison material. The data obtained in these tests are used to prepare FIG. 10, showing the trend with time of the maximum value of the PL peak for the four tested specimens; curves 1 to 3 in this Figure refer to specimens of the Samples of like number, while curve 4 refers to the reference material. The graphs in FIG. 10 show that the comparison NPs lost a significant part of the PL in the first minute and it further dropped down to 18% of the initial PL intensity after 60 min of exposure to the laser (PL loss of 82%). In contrast thereto, over the same period of time, the specimens of Sample 1, Sample 2 and Sample 3 of the invention lost 22%, 8% and 6% respectively, demonstrating the high stability of the OMH NPs of the invention.

Example 7 (Comparative)

For assessing the role of the bi-functional additive molecules of the invention, the synthesis of Example 2 was repeated with several mono-functional ligands. $CsPbBr_3$ NP samples were prepared coated with Cs-oleate, mixed ligands (Cs-oleate/oleylammonium bromide) and quaternary ammonium bromide (QAB capped). These materials were tested under the harsh conditions of Example 6. All the samples lost their PL instantly upon addition of methanol.

Example 8

The test of Example 7 was repeated on a specimen of Sample 3 (core of composition $Cs_{0.5}FA_{0.5}PbBr_3$). For comparison, the synthesis of Example 2 was repeated in identical conditions, using however the monovalent ligand phenethylammonium bromide (PEABr, functional group ammonium) in place of AVAc.

Figure 11A:
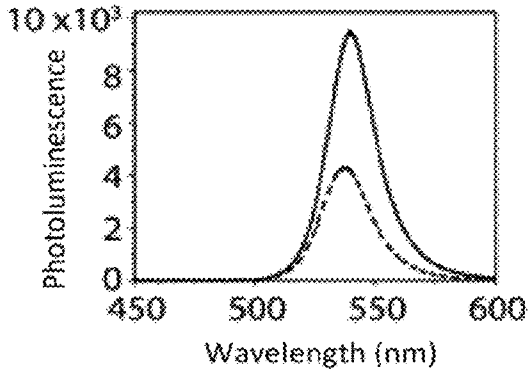
FIGS. 11*a* and 11*b* show, respectively, the variation of PL emission of a sample of NPs of the prior art and of a sample of the invention under high flux (laser) irradiation.
Figure 11B:
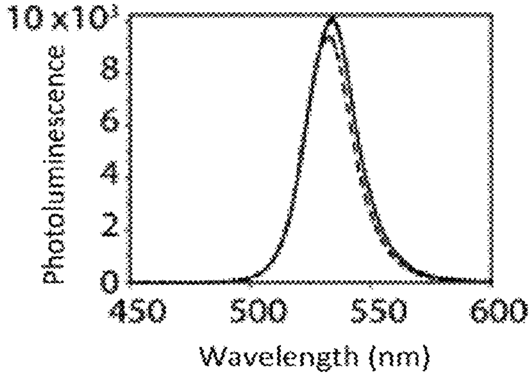

The stability of the NPs under high flux irradiation is reported in FIG. 11; in particular, the two spectra in FIG. 11*a* show the loss of photoluminescence of the reference specimen, while the two spectra in FIG. 11*b* show the behavior of the specimen of the invention. The reference sample prepared using PEABr lost 56% of the initial PL after 60 min of exposure to the laser. The specimen of Sample 3 lost instead 6% of the PL over the same irradiation time.

Figure 12:
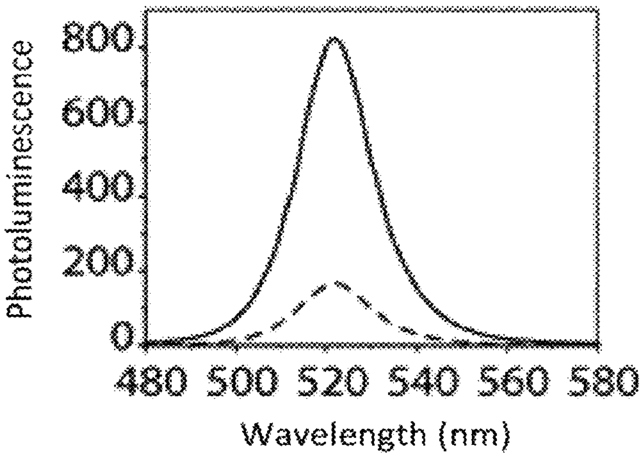
FIG. 12 shows the PL spectra of the two samples of FIGS. 11*a* and 11*b* dispersed in ethanol.

Similar trends in stability were observed when the samples were dispersed in methanol: FIG. 12 reproduces the PL curves of dispersions in methanol of the specimen of Sample 3 (upper curve in the figure) and of the reference specimen (lower curve in the figure).

Example 9

Figure 13A:
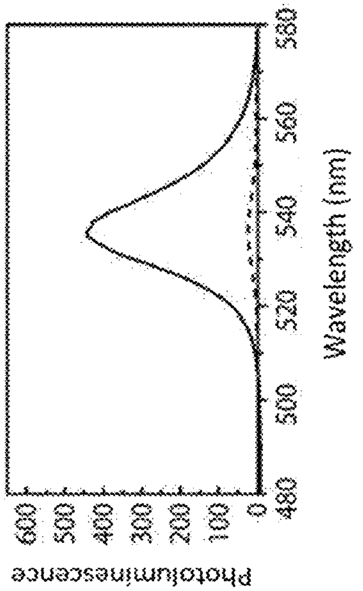
FIG. 13 reproduces PL spectra obtained from samples of the invention prepared with different additive molecules under high flux (laser) irradiation, and for comparison spectra (dashed lines) of a sample prepared without additive molecules.
Figure 13B:
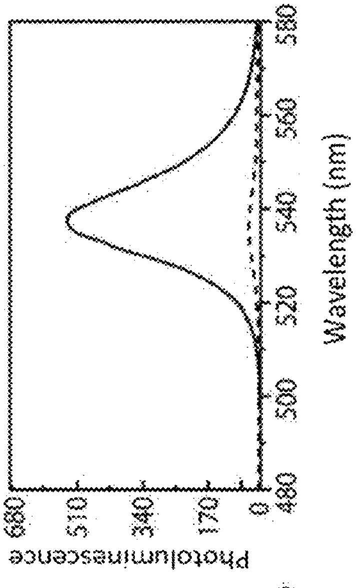
Figure 13C:
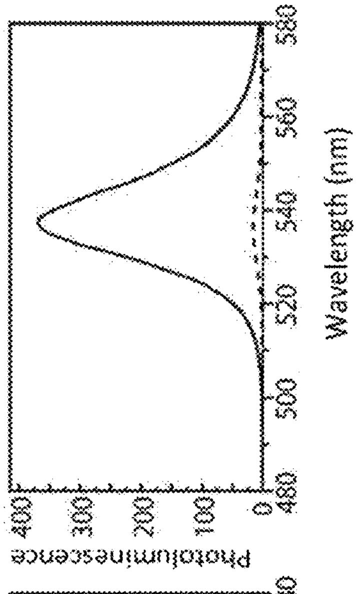
Figure 13D:
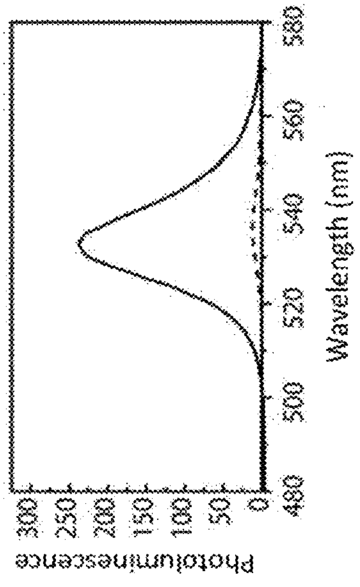
Figure 13E:
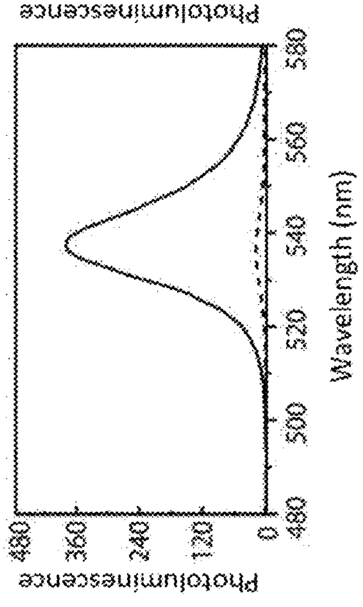
Figure 13F:
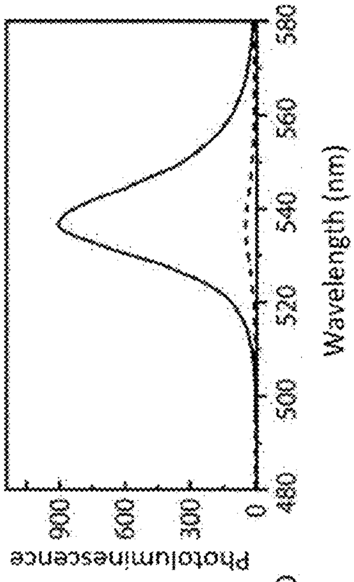

Several NP compositions according to the invention were prepared following the procedure of Example 1, using FABr as the bromide salt, and various additive molecules different from AVAc. The test of Example 7 was repeated on the NPs thus prepared. The results of the tests are reproduced in FIG. 13: in particular, the PL spectra obtained refer to NP samples obtained with the additive molecules succinic acid (FIG. 13*a*), γ-aminobutiryc acid (FIG. 13*b*), 2-aminoterephthalic acid (FIG. 13*c*), L-proline (FIG. 13*d*), 3-aminopropylphosphonic acid (FIG. 13*e*) and L-glutamic (FIG. 13*f*). Each graph also reproduces (dashed lower curve in each panel) the PL of a sample prepared without the additive molecules of the invention. As it is apparent from the spectra in FIG. 13, the use of the additive molecules of the invention allows obtaining NPs with a remarkable retention of PL compared to prior art compositions.

The invention claimed is:

1. A process for the production of optoelectronic metal halide nanoparticles, formed by polymer-coated metal halide nanocrystals, comprising the following steps:

a) preparing a precursor solution comprising:
   - a solvent selected among dimethyl sulfoxide, N,N-dimethyl acetamide, dimethyl formamide, N-methyl formamide and mixtures thereof;
   - halide salts of one or more cations intended for forming the nanocrystals, wherein the halide anion is one or more selected among $F^-$, $Cl^-$, $Br^-$ and $I^-$, wherein said one or more cations comprise a divalent cation M selected between $Pb^{2+}$ and $Sn^{2+}$, a tetravalent cation M' selected between $Sn^{4+}$ and $Ti^{4+}$, and a trivalent cation M" selected among $Al^{3+}$, $Bi^{3+}$, $Sb^{3+}$, $Yb^{3+}$, $Eu^{3+}$, $Er^{3+}$, $Ho^{3+}$ and $Nd^{3+}$;
   - a block copolymer containing one or more polar blocks and one or more non-polar or moderately polar blocks, wherein said one or more non-polar or moderately polar blocks are soluble in a solvent selected among toluene, xylene, mesitylene, ethyl acetate, anisole and mixtures thereof;

b) adding the precursor solution dropwise to a solvent which is selective for the non-polar or moderately polar blocks of the block copolymer, selected among toluene, xylene, mesitylene, ethyl acetate, anisole and mixtures thereof forming a suspension, and allowing the system to react forming optoelectronic metal halide nanoparticles, until the obtained suspension changes color;

c) quenching the reaction of step b) by addition of a solvent selected among pentane, hexane, heptane, diethyl ether and mixtures thereof;

d) collecting the optoelectronic metal halide nanoparticles;

characterized in that the precursor solution of step a) further comprises one or more additive molecules, characterized by containing two or more functional groups and one or more aliphatic, cycloaliphatic or aromatic chains.

2. The process according to claim 1, wherein said metal halide nanocrystals have composition:

$AMX_3$, wherein A is a monovalent cation selected among $Cs^+$, methylammonium, $(CH_3NH_3^+)$ and formamidinium $(CH(NH_2)_2^+)$, possibly partially substituted with one or more dopants selected among monovalent cations and divalent cations, M is a divalent cation selected between $Pb^{2+}$ and $Sn^{2+}$, and X is selected among $F^-$, $Cl^-$, $Br^-$ and $I^-$ or mixtures thereof;

$A_2M'X_6$, wherein A is a monovalent cation as indicated above and M' is a tetravalent cation selected between $Sn^{4+}$ and $Ti^{4+}$;

$A_2M'M''X_6$, wherein A and M' are monovalent cations as indicated above and M'' is a trivalent cation selected among $Al^{3+}$, $Bi^{3+}$, $Sb^{3+}$, $Yb^{3+}$, $Eu^{3+}$, $Er^{3+}$, $Ho^{3+}$ and $Nd^{3+}$; and $A_3M''_2X_9$, wherein A is a monovalent cation as indicated above and M'' is a trivalent cation as indicated above.

3. The process according to claim 1, wherein in said block copolymer the polar blocks are selected between poly acrylic acid (PAA) and poly methacrylic acid (PMA) and said non-polar or moderately polar blocks are selected among poly(alkyl methacrylate) s with length of the alkyl chain(s) ranging from 1 to 12 carbon atoms, polyesters and polystyrene.

4. The process according to claim 3, wherein said polyesters are selected among polylactide, polyglycolide and polycaprolactone.

5. The process according to claim 3, wherein said block copolymer has the general formula:

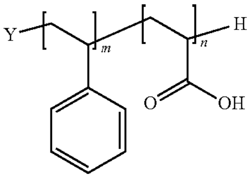

wherein m ranges between 14 and 14000, n ranges between 10 and 5200, and Y is or bears a nitrile functional group.

6. The process according to claim 1, wherein said one or more additive molecules are selected among succinic acid, γ-aminobutyric acid, 5-aminovaleric acid, 3-aminopropylphosphonic acid, L-valine, L-proline, L-glutamic acid and 2-aminoterephthalic acid.

7. The process according to claim 1, wherein the concentration of the M, M' or M'' cation(s) in said precursor solution is between 10 and 100 mM/l.

8. The process according to claim 1, wherein in said precursor solution the molar ratio between the polar blocks monomers of the block copolymer and the M, M' or M'' cation(s) is between 10 and 20, and the molar ratio between the M, M' or M'' cation(s) and said additive molecules is between 20 and 30.

9. The process according to claim 1, wherein the precursor solution is prepared by:

mixing separate stock solutions of halide salts, block copolymers and additive molecules;

or adding all the required components to one of the solvents of step a).

10. The process according to claim 1, wherein the addition of the precursor solution of step a) to the solvent of step b) takes place at a temperature between 2° and 25° C. and a pressure between $9.8 \cdot 10^4$ and $1.04 \cdot 10^5$ Pa under agitation.

11. The process according to claim 1, wherein the quenching of step c) takes place by addition of a solvent selected among pentane, hexane, heptane, diethyl ether and their mixtures in a volume of at least 1.5 times the volume of the suspension prepared in step b).

12. The process according to claim 1, wherein said aliphatic, cycloaliphatic or aromatic chains of said additive molecules have a chain length comprised between 4 and 12 carbon atoms.

13. The process according to claim 2, wherein said monovalent cations are selected between $K^+$ and $Rb^+$.

14. The process according to claim 2, wherein said divalent cations are selected among $Mn^{2+}$, $Cd^{2+}$, $Zn^{2+}$, $Sn^{2+}$ and $Ge^{2+}$.

* * * * *